Nov. 20, 1934.                G. E. NERNEY                1,981,464
                          EYEGLASS CONSTRUCTION
                          Filed Sept. 10, 1932
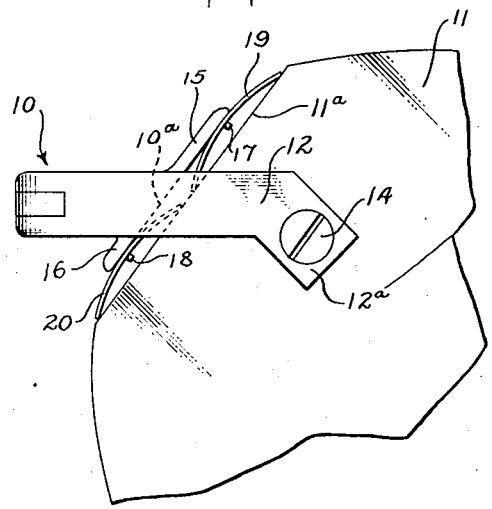
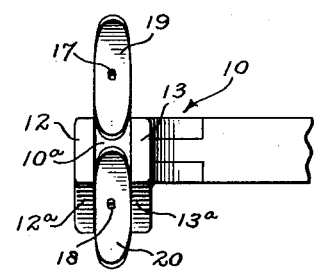
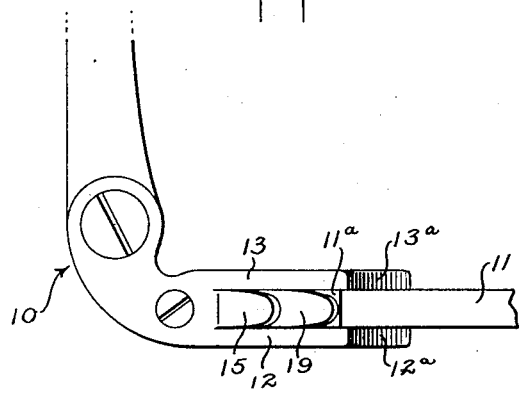
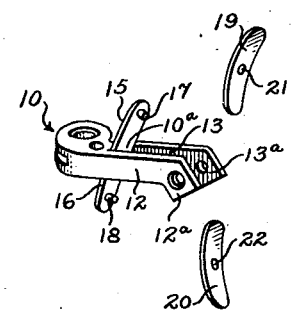
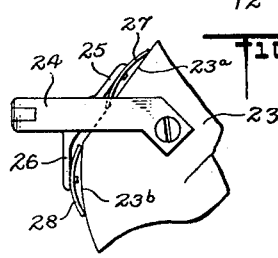
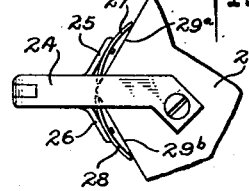
INVENTOR
George E. Nerney
BY
Janney, Blair & Curtis
ATTORNEYS Patented Nov. 20, 1934

1,981,464

UNITED STATES PATENT OFFICE 1,981,464

EYEGLASS CONSTRUCTION

George E. Nerney, Attleboro, Mass., assignor to Bay State Optical Company, Attleboro, Mass., a corporation of Maine Application September 10, 1932, Serial No. 632,489

17 Claims. (Cl. 88—47)

This invention relates to an eyeglass construction and, with regard to its more specific features, to the endpieces of rimless frames.

One of the objects of this invention is to provide an endpiece construction for eyeglasses which will be strong, durable and thoroughly practical. Another object is to provide a construction of the above character which may be easily manufactured with a minimum amount of labor. Another object is to provide a construction of the above character which is well adapted to withstand the wear and tear of hard use and at the same time enhances the entire frame. Another object is to provide a construction of the above character which may be conveniently applied to lenses of different shapes. Another object is to provide a construction of the above character wherein certain parts of the endpiece are successfully cushioned on the edge of the lens in a practical and highly desirable manner. Another object is to provide a construction of the above character which may be subjected to various stresses and strains without hazarding the breakage of lenses. Another object is to provide a construction of the above character which is particularly advantageous for use on those frames characterized by endpiece connections above the transverse axis of the lens. Other objects will be in part obvious and in part pointed out hereinafter.

The invention accordingly consists in the features of construction, combinations of elements and arrangements of parts as will be exemplified in the structure to be hereinafter described, and the scope of the application of which will be indicated in the following claims.

In the accompanying drawing, in which is shown one or more of the various possible embodiments of my invention, Figure 1 is a front elevation of a portion of an eyeglass lens with my novel endpiece mounted thereon;

Figure 2 is a top plan view of the parts shown in Figure 1;

Figure 3 is a side elevation of my endpiece as assembled and ready to be placed in position on an eyeglass lens;

Figure 4 is an exploded perspective view of my endpiece;

Figure 5 is a front elevation of a modification of my endpiece as mounted on a lens, and Figure 6 is a front elevation of my endpiece as mounted on a lens of another shape.

Similar reference characters refer to similar parts throughout the several views of the drawing.

As conducive to a clearer understanding of certain features of this invention, it might here be pointed out that in the past considerable difficulty has been experienced in mounting endpieces upon lenses. Most endpieces for rimless frames are secured to the lenses by a supporting screw extending therethrough. Inasmuch as the holes for these screws are generally formed by retailers after the sale of the frame, inaccuracies often occur with the result that the endpieces are secured to the frame in a faulty manner. For example, if the hole is positioned too near the edge of the lens, the lens strap will be spaced from the edge so that the connection will soon become loose. A bending of the lens strap is not a practical solution of this difficulty as the lens strap is formed from weak material and also because such bending is liable to throw the endpiece out of line. A further difficulty found in these connections is the possibility of breakage due to the fact that the lens strap often rests flush against the edge of the lens, and a force applied in any direction to the endpiece forces the strap toward the lens which often results in breakage. The above-mentioned difficulties are particularly emphasized in frames characterized by endpieces spaced above the transverse axis of the lens. In such frames, due to the peculiar angle which the endpiece must assume in order to have the temple run in the right direction, the mounting of the endpiece upon the lens in an accurate manner is decidedly important. Briefly, endpieces of this general character cause considerable trouble during mounting and form one of the vulnerable spots of the frame after the frame is completely assembled. One of the objects of this invention is to provide a construction in which the above-mentioned difficulties, as well as many others, will be successfully and practically overcome.

Referring now to the drawing in detail, there is shown in Figure 1 an endpiece generally indicated at 10 mounted upon a lens 11. Lens 11, as here shown, is preferably a part of a rimless frame of the type generally known as "Ful-Vue" wherein the endpieces are spaced from the transverse axes of the lenses. Lens 11 is further characterized by the shape of its edge and, more particularly, the top portion 11a thereof which is regular and slants upwardly or inwardly substantially in a direction toward the nose of the wearer.

As more clearly shown in Figure 3, a pair of arms 12 and 13 extend inwardly from endpiece 10 and are preferably integral parts thereof. Arms 12 and 13 are in substantial alignment with endpiece 10 as they extend inwardly, but the innermost portions 12a and 13a thereof extend downwardly or in a direction substantially toward the center of lens 11 (see Figure 1). A screw 14 extends through portion 12a of arm 12, lens 11, and is threaded into portion 13a of arm 13, as best shown in Figure 1. Accordingly, screw 14 serves to hold arms 12 and 13 in position flush against the opposite surfaces of lens 11, thus to hold endpiece 10 in proper relation to the lens.

The inner end surface 10a of endpiece 10, positioned between the junctions of the endpiece and arms 12 and 13, slants in an outward direction, as viewed in Figure 1, and, when the endpiece is in its proper position, this surface is substantially parallel to edge 11a of lens 11. Extending from the top and bottom sides of endpiece 10, as best shown in Figures 1 and 4, is a pair of parts 15 and 16 rigidly secured to or integral with the endpiece. Parts 15 and 16 form a lens strap for endpiece 10, and the inner surfaces thereof (Figure 1) adjacent edge 11a of lens 11 are preferably in alignment with the surface 10a of endpiece 10. Parts 15 and 16 are spaced from edge 11a of lens 11 and a pair of lugs 17 and 18 extend inwardly toward edge 11a preferably from the opposite end portions of parts 15 and 16 (Figure 4). Disposed between parts 15 and 16 and edge 11a of the lens are a pair of arc shaped springs 19 and 20, as best shown in Figure 4. Formed in springs 19 and 20, substantially at their center points, are holes 21 and 22 through which lugs 17 and 18 extend to hold the springs in their proper position along edge 11a. Preferably part 16 is shorter than part 15 in order to position springs 19 and 20 properly along edge 11a in this particular type of mounting.

Accordingly, when endpiece 10 is properly assembled upon lens 11, as shown in Figure 1, springs 19 and 20 serve as cushions between parts 15 and 16 of the endpiece and the edge 11a of the lens. Furthermore, springs 19 and 20 are sufficiently rigid to resist any appreciable movement of endpiece 10, about screw 14 as an axis. However, if a force is applied on the upper or lower side of the endpiece to initiate rotation about the screw 14 in either direction, the total force of this movement will be concentrated at the ends of the parts 15 and 16 which are positioned substantially above the central portions of springs 19 and 20. For example, should a force be applied to the lower side of endpiece 10 to force it to pivot in a counter-clockwise direction about screw 14, the end portion of part 15 would move toward the edge 11a. However, this force would be counteracted by spring 19 and spread to two points upon the edge of the lens, namely, the points of contact of the opposite ends of spring 19. I have found that the balancing action of springs 19 and 20 is particularly advantageous for in this way no matter in what direction endpiece 10 has a tendency to pivot, the force resulting from such pivoting action is counteracted fully for it is applied to the central portion of either of springs 19 or 20, the full cushioning effect of the springs thus being utilized. Also, any inaccuracies in the positioning of the hole for screw 14 are automatically compensated for by the yielding effect of springs 19 and 20, this feature being especially important in "Ful-Vue" mountings, as described above, wherein it is highly desirable to position the endpiece on the lens accurately.

An endpiece construction of this character is well adapted for application to lenses of many different shapes and may also be applied at different points on the lens. For example, in Figure 5, there is shown a lens 23 having edge portions 23a and 23b. Endpiece 24 has here been mounted at a lower position on the lens so that part 25 is in registry with edge portion 23a, while part 26 is in registry with edge portion 23b, this being accomplished by bending parts 25 and 26 into proper positions. Accordingly, endpiece 24 is securely mounted in this position on lens 23 and spring 27 contacts edge portion 23a at two points; likewise spring 28 contacts edge portion 23b at two spaced points. The balanced cushioning effect of springs 27 and 28, as described above, is thus maintained for the endpiece in this new position.

Referring to Figure 6, I may also mount this endpiece 24 on lenses of various other shapes. For example, lens 29 has converging edge portions 29a and 29b. Similarly, parts 25 and 26 are merely bent to asume their proper positions, and it will be noted that the opposite ends of spring 27 contact edge portion 29a while the ends of spring 28 contact edge portion 29b. Accordingly, it will be seen that my endpiece may be easily mounted upon a lens of any shape and, when mounted, the connection between the endpiece and the lens is secure and durable while in use.

It will thus be seen that I have provided a thoroughly practical and efficient construction in which the several objects mentioned above, as well as many others, have been successfully and efficiently accomplished.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In eyeglass construction, in combination, a lens, an eyeless part connected to said lens, a strap member connected to said part and substantially following a portion of the edge of said lens, said strap member being spaced from the edge of said lens, a pair of lugs extending inwardly from said strap member substantially at the opposite ends thereof and toward the edge of said lens, and a pair of arc shaped spring members having holes extending through their central portions disposed between said strap member and the edge of said lens so that said lugs extend through said holes, the opposite ends of each of said spring members engaging the edge of said lens.

2. In eyeglass construction, in combination, a lens, a saddle including a pair of arms extending over the opposite surfaces of said lens, a member extending through said lens and into said arms to connect said saddle to said lens, a strap connected to said saddle and extending therefrom in opposite directions in registry with the edge of said lens, a pair of lugs extending inwardly from said strap at points on the opposite sides of said saddle, and a pair of arc shaped spring members having holes extending through their central portions, said lugs extending through said holes to retain said spring members in positions on the opposite sides of said saddle so that their opposite ends are in engagement with the edge of said lens.

3. In eyeglass construction, in combination, a lens, lens-retaining means comprising a saddle with spaced arms engaging the opposite surfaces of said lens, a member extending through said lens and into each of said arms to connect said arms to said lens, a strap secured to said saddle and substantially following the edge of said lens, and a pair of arc shaped spring members interposed between said strap and the edge of said lens, said spring members engaging said strap at spaced points and the opposite ends of each of said spring members engaging the edge of said lens at spaced points.

4. In eyeglass construction, in combination, a lens, lens-retaining means comprising a saddle with spaced arms engaging the opposite surfaces of said lens, a member extending through said lens and into each of said arms to connect said arms to said lens, a strap rigidly secured to said saddle and substantially following the edge of said lens, and a pair of arc shaped spring members engaging said strap at spaced points and engaging the edge of said lens at four spaced points whereby two point support is provided against movement in either direction of said lens-retaining means about said member as a pivot.

5. In eyeglass construction, in combination, a spectacle part, a lens, a pair of arms extending inwardly over the opposite surfaces of said lens, means pivotally connecting said arms to said lens, a strap rigidly connected to said part and in registry with the edge of said lens, and a pair of spring members connected to said strap at spaced points and each engaging the edge of said lens at spaced points whereby four point support is provided against radial strain exerted around that portion of the edge of said lens in engagement with said spring members.

6. In eyeglass construction, in combination, a lens, portions of whose periphery converge to a point, means forming an endpiece adjacent said point, a pair of arms secured to said endpiece and extending over the opposite surfaces of said lens, means connecting said arms to said endpiece, a pair of rigid extensions extending away from said endpiece in opposite directions in substantial registry with the periphery of said lens, and a pair of spring members each secured to one of said extensions and engaging the periphery of said lens on opposite sides of said point.

7. In eyeglass construction, in combination, a substantially circular lens, one portion of whose periphery is straight, means forming an endpiece including a pair of arms extending over the opposite surfaces of said lens, means connecting said arms to said lens so that said endpiece lies adjacent one end of said straight portion, a rigid arm extending from said endpiece in registry with said straight portion, a rigid arm extending from said endpiece in an opposite direction in registry with a rounded portion of the periphery of said lens, and a pair of springs each interposed between one of said rigid arms and the periphery of said lens.

8. In eyeglass construction, in combination, a substantially circular lens, one portion of whose periphery is straight, means forming an endpiece including a pair of arms extending over the opposite surfaces of said lens, means connecting said arms to said lens so that said endpiece lies adjacent one end of said straight portion, a rigid arm extending from said endpiece in registry with said straight portion, a rigid arm extending from said endpiece in an opposite direction in registry with a rounded portion of the periphery of said lens, and a pair of arcuate shaped springs the convex portions of which each engage one of said rigid arms while the extremities of one engage said straight portion and the extremities of the other engage the rounded portion of said lens.

9. In eyeglass construction, in combination, a lens, an endpiece, means connecting said endpiece with said lens, and resilient members interposed between said endpiece and the edge of said lens and contacting said lens at four points spaced circumferentially along the edge of said lens whereby four point support is provided against radial strain exerted around that portion of the edge of said lens in engagement with said resilient members.

10. In eyeglass construction, in combination, a lens, an endpiece including a main body portion and a pair of arms extending therefrom over the opposite surfaces of said lens, a member extending through said lens and into said arms to connect said endpiece to said lens, a strap element associated with said body portion and positioned substantially between said arms adjacent the edge of said lens, and resilient members interposed between said strap element and the edge of said lens and engaging said lens at points on each side of said endpiece and centrally thereof.

11. In eyeglass construction, in combination, a lens, a part connected to said lens, a strap member connected to said part substantially following the edge of said lens and spaced therefrom, and a pair of arc-shaped spring members connected to said strap at spaced points and each having both of their ends in engagement with said edge.

12. In eyeglass construction, in combination, means forming an endpiece, a lens, means connecting said endpiece to said lens so that one end of said endpiece is in substantial registry with the edge of said lens, a strap rigidly secured to said endpiece and in registry with the edge of said lens, and a pair of spring members each interposed between said strap and the edge of said lens and each engaging the edge of said lens at spaced points.

13. In eyeglass construction, in combination, a lens, lens-retaining means including a pair of arms extending over the opposite surfaces of said lens, means connecting said arms to said lens, a strap rigidly secured to said lens-retaining means and in substantial registry with the edge of said lens, and a pair of resilient members each interposed between said strap and the edge of said lens and each engaging the edge of said lens at spaced points.

14. In eyeglass construction, in combination, a lens having a straight edge at a substantially acute angle to the transverse axis thereof and inclined inwardly toward the vertical axis of said lens, an eyeglass part including a saddle comprising a body portion and a pair of spaced arms extending over the opposite surfaces of said lens, a member extending through said arms and said lens at a point spaced from said edge to connect said part to said lens so that the base portion of said saddle lies adjacent said straight edge, said base portion being substantially parallel to said straight edge and said arms extending inwardly at an obtuse angle to said base portion and said straight edge, a strap connected to said body portion in alinement with said straight edge and extending upwardly from said body portion, the surface of said base portion and said strap being in substantially the same plane, and resilient means disposed between said strap and said edge.

15. In eyeglass construction, in combination, a lens having a straight edge at a substantially acute angle to the transverse axis thereof and inclined inwardly toward the vertical axis of said lens, an eyeglass part including a saddle comprising a body portion and a pair of spaced arms extending over the opposite surfaces of said lens, a member extending through said arms and said lens at a point spaced from said edge to connect said part to said lens so that the base portion of said saddle lies adjacent said straight edge, said base portion being substantially parallel to said straight edge and said arms extending inwardly at an obtuse angle to said base portion and said straight edge, a strap connected to said body portion in alinement with said straight edge and extending upwardly from said body portion and substantially parallel to said straight edge, and resilient means disposed between said strap and said edge.

16. In eyeglass construction, in combination, a lens having a straight edge at a substantially acute angle to the transverse axis thereof and inclined inwardly toward the vertical axis of said lens, an eyeglass part including a saddle comprising a body portion and a pair of spaced arms extending over the opposite surfaces of said lens, a member extending through said arms and said lens at a point spaced from said edge to connect said part to said lens so that the base portion of said saddle lies adjacent said straight edge, said base portion being substantially parallel to said straight edge and said arms extending inwardly at an obtuse angle to said base portion and said straight edge, a strap connected to said body portion in alinement with said straight edge and extending upwardly from said body portion and substantially parallel to said straight edge, a spring leaf connected to said strap and disposed between said strap and said straight edge, and resilient means disposed between said base portion and said straight edge.

17. In eyeglass construction, in combination, a lens having a straight edge at a substantially acute angle to the transverse axis thereof and inclined inwardly toward the vertical axis of said lens, an eyeglass part including a saddle comprising a body portion and a pair of spaced arms extending over the opposite surfaces of said lens, a member extending through said arms and said lens at a point spaced from said edge to connect said part to said lens so that the base portion of said saddle lies adjacent said straight edge, said base portion being substantially parallel to said straight edge and said arms extending inwardly at an obtuse angle to said base portion and said straight edge, a strap connected to said body portion in alinement with said straight edge and extending upwardly from said body portion and substantially parallel to said straight edge, and a spring leaf connected to said strap at a point spaced from said body portion and disposed between said strap and said straight edge.

GEORGE E. NERNEY.